J. WISTED.
CONVERTIBLE SLEIGH AND WHEELED VEHICLE.
APPLICATION FILED APR. 16, 1914.
1,134,657.
Patented Apr. 6, 1915.
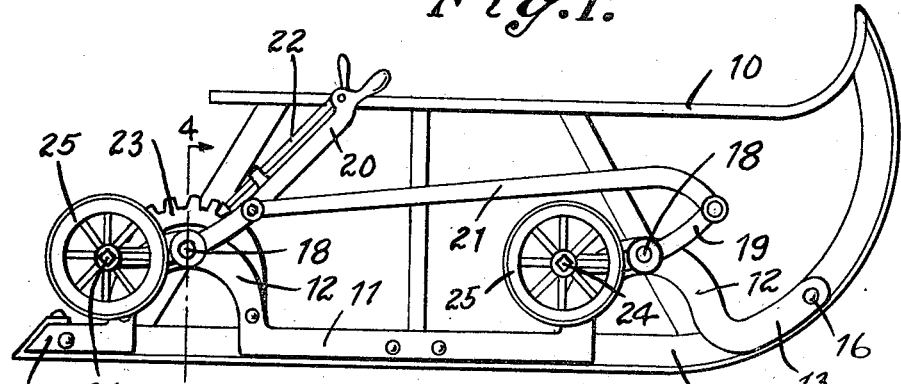
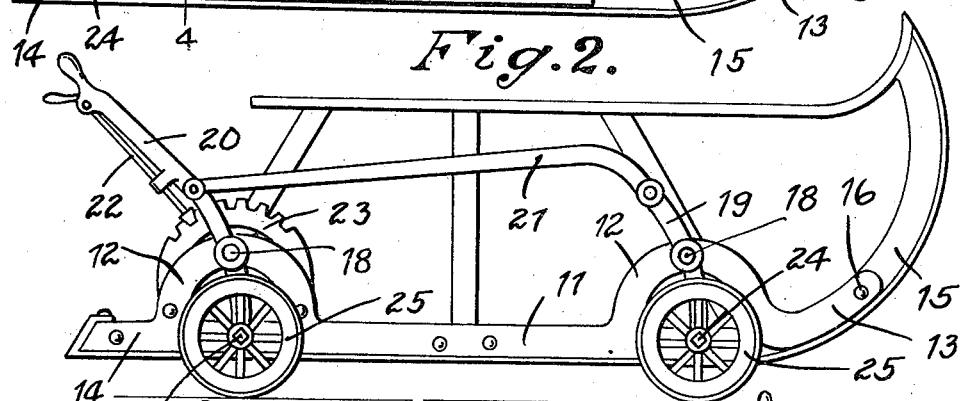
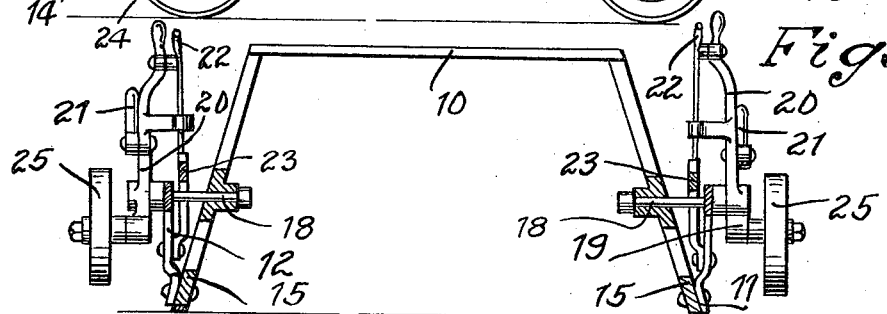
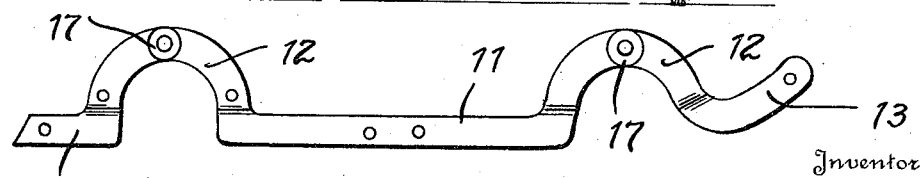
Inventor
J. Wisted

UNITED STATES PATENT OFFICE.

JAMES WISTED, OF MYNCASTER, BRITISH COLUMBIA, CANADA.

CONVERTIBLE SLEIGH AND WHEELED VEHICLE.

1,134,657.   Specification of Letters Patent.   Patented Apr. 6, 1915.

Application filed April 16, 1914. Serial No. 832,374.

*To all whom it may concern:*

Be it known that I, JAMES WISTED, a subject of the King of England, residing at Myncaster, in the Province of British Columbia, Canada, have invented certain new and useful Improvements in Convertible Sleighs and Wheeled Vehicles; and I do hereby declare the following to be a full, clear, and exact description of the invention, such as will enable others skilled in the art to which it appertains to make and use the same.

This invention relates to convertible sleighs and wheeled vehicles.

The principal object of the invention is to improve and simplify devices of this description.

A second object of the invention is to provide an improved frame for supporting the wheels on a vehicle which is ordinarily designed to act as a sleigh.

With the above and other objects in view the invention consists in general of certain novel details of construction and combination of parts hereinafter fully described, illustrated in the accompanying drawings, and specifically claimed.

In the accompanying drawings, like characters of reference indicate like parts in the several views, and Figure 1 is a side elevation of the device when in use as a sleigh truck. Fig. 2 is a side elevation of the device when in use as a wheel truck. Fig. 3 is a side view of the frame iron used in connection with this device. Fig. 4 is a section on the line 4—4 of Fig. 1.

This device is used primarily for the purpose of converting an ordinary sleigh or sleigh runner supported vehicle into a wheel supported vehicle. Moreover, a special form of frame iron is used in connection herewith which enables the attachment to be readily applied thereto.

In the drawings accompanying this specification there is disclosed a sleigh runner which is indicated in general at 10 but it is to be understood that this sleigh runner is of special construction and that the lower or frame iron thereof consists of a member which is provided with a centrally disposed portion 11 provided at each end with upwardly arched portions 12. The front portion 12 is reversely curved as at 13 while the rear portion 12 is provided with an extension 14 in alinement with the body of the iron. To this frame iron are secured the runners 15 which conform to the portions 11, 13 and 14. Each runner is secured by means of suitable braces which are connected to the frame iron 11 by rivets located at 16. In each of the upwardly bowed portions 12 is provided a shaft bearings 17 each of which carries a stub shaft 18 whereon is mounted at each side of the front end a lever 19 and at the rear end a lever 20. Each lever 19 is connected to a lever 20 by means of a link 21 and the lever 20 is provided with a suitable latch mechanism 22 working over a quadrant 23 secured to the frame iron by any suitable means. The remaining ends of the levers just described are provided with stub shafts 24 whereon are mounted wheels 25 which are so positioned that when the lever 20 at the rear end is moved backward these wheels will be projected below the runner so that the vehicle will bear thereon. Thus the device by moving the lever 20 rearwardly may be used as a wheeled vehicle while by moving said lever forwardly it may be used as a vehicle supported on sleigh runners.

There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is wished to include all such as come properly within the scope claimed.

Having thus described the invention, what is claimed as new, is:—

In a device of the kind described, a sleigh runner iron provided with a main body portion, an upwardly bowed portion at each end of the main body portion provided with a bearing opening, runner attaching portions at each end of said upwardly bowed portions, a stub shaft supported by each of said bearings, a runner attached to said iron, rock arms on said stub shafts, wheels on said arms, other rock arms on said shafts, one of said arms last mentioned constituting a lever, a link connecting the last mentioned arms, latch means on the lever arm, and a segment coöperating with said latch means carried by said iron.

In testimony whereof, I affix my signature, in the presence of two witnesses.

JAMES WISTED.

Witnesses:
CHAS. HASTINGS,
THOMAS WISTED, Jr.

Copies of this patent may be obtained for five cents each, by addressing the "Commissioner of Patents, Washington, D. C."